United States Patent
Tayade

(10) Patent No.: US 9,007,943 B2
(45) Date of Patent: Apr. 14, 2015

(54) METHODS AND STRUCTURE FOR REDUCED LAYOUT CONGESTION IN A SERIAL ATTACHED SCSI EXPANDER

(75) Inventor: Tejas Tayade, Pune (IN)

(73) Assignee: LSI Corporation, Milpitas, CA (US)

( * ) Notice: Subject to any disclaimer, the term of this patent is extended or adjusted under 35 U.S.C. 154(b) by 323 days.

(21) Appl. No.: 13/567,430

(22) Filed: Aug. 6, 2012

(65) Prior Publication Data

US 2014/0036699 A1 Feb. 6, 2014

(51) Int. Cl.
- G06F 3/00 (2006.01)
- G06F 11/00 (2006.01)
- G06F 13/40 (2006.01)
- H04L 12/931 (2013.01)

(52) U.S. Cl.
CPC ............ H04L 49/00 (2013.01); G06F 13/4022 (2013.01)

(58) Field of Classification Search
USPC ....... 370/252; 710/11, 317; 714/6.1; 719/326
See application file for complete search history.

(56) References Cited

U.S. PATENT DOCUMENTS

| | | | |
|---|---|---|---|
| 8,095,722 B1 * | 1/2012 | Liao et al. | 710/317 |
| 8,687,629 B1 * | 4/2014 | Kompella et al. | 370/388 |
| 2006/0165070 A1 * | 7/2006 | Hall et al. | 370/369 |
| 2006/0194386 A1 * | 8/2006 | Yao et al. | 438/257 |
| 2007/0047444 A1 * | 3/2007 | Leroy et al. | 370/235 |
| 2007/0121499 A1 * | 5/2007 | Pal et al. | 370/230 |
| 2009/0172706 A1 * | 7/2009 | Jones | 719/326 |
| 2013/0191573 A1 * | 7/2013 | Raghavan et al. | 710/300 |
| 2013/0332768 A1 * | 12/2013 | Koga et al. | 714/6.1 |
| 2014/0040510 A1 * | 2/2014 | Myrah et al. | 710/11 |

* cited by examiner

Primary Examiner — Jung Park
Assistant Examiner — Chuong M Nguyen
(74) Attorney, Agent, or Firm — Duft Bornsen & Fettig LLP

(57) ABSTRACT

Methods and structure for reduced layout congestion in a switching device integrated circuit. A switching device such as a Serial Attached SCSI (SAS) expander comprises a switching circuit to couple any of a plurality ("N") of physical links of the switching device with any other physical link of the switching device. The switching circuit comprises a first stage circuit adapted to couple any of the N physical links with a selected one of N/2 communication paths of the switching circuit and comprises a second stage circuit adapted to couple any of the N/2 communication paths with any of the N physical links. Since only N/2 communication paths may be active at any time in such a switching device, a control unit of the switching device tracks which of the N/2 communication paths are presently in use or unused so that an unused path may be selected for a new connection.

12 Claims, 5 Drawing Sheets

METHODS AND STRUCTURE FOR REDUCED LAYOUT CONGESTION IN A SERIAL ATTACHED SCSI EXPANDER

BACKGROUND

1. Field of the Invention

The invention relates generally to switching device and more specifically relates to methods and structure to reduce the congestion and complexity of integrated circuit (IC) die layout for a switching device such as a Serial Attached SCSI (SAS) expander.

2. Discussion of Related Art

A number of communication media and protocols utilize switching devices to controllably route one end device to another end device to establish a temporary connection between the end devices through the switching device. In the context of a SAS domain, the Service Delivery Subsystem (e.g., the "switched fabric") comprises one or more SAS expanders to couple a SAS initiator device to an identified SAS target device for purposes of a desired connection to exchange information.

Switching devices generally comprise a plurality of physical links (e.g., SAS PHYs) that serve as the communications interface between a first device coupled with a first physical link and a second device coupled with a second physical link. Such switching devices (e.g., SAS expanders) further typically comprise a complex switching circuit able to connect any physical link to any other physical link of the switching device. Often, a so-called "crossbar switch" is used for such controlled connections. Often the switching device (including the switching circuit) is designed as a single IC die. Such switching circuits typically comprise a large number of connection paths (i.e., conductive traces routed within the IC die) to allow such coupling of any link to any other link of the switching device. A switching device may comprise any number (N) of such physical links and thus the number or conductive traces will typically be at least N. Routing a large number of such conductive traces in an IC die can present a number of problems. The routes (conductive traces passing through the switching circuit) must be approximately equal in length so that there are not significantly different propagation delays in different connections between physical links. Further, although typical computer aided engineering (CAE) tools assist in this routing function, the complexity of resolving this routing problem increases as the number of such traces increases. The problem is often referred to as "congestion" in that there are numerous timing and IC die area constraints in the design and layout of the IC for such switching circuits.

A variety or presently known designs may all be referred to herein as "crossbar switches". Common crossbar switch designs include: multiple Banyan switches in a "Butterfly" combination or large multiplexer configurations. All such present crossbar switch designs incorporate a large number of internal traces for routing within the switching circuit. In general, where the number of physical links is "N", present crossbar switch designs include $N^2$ communication paths (i.e., internal conductive traces of the crossbar switch) to permit coupling of any of N physical links to any other of the N physical links. Such a significant number of internal communication paths causes complexity and congestion in the layout of the IC die for the switching device.

Thus it is an ongoing challenge to reduce the complexity and hence congestion in the routing of traces for switching circuits within a switching device such as a SAS expander.

SUMMARY

The present invention solves the above and other problems, thereby advancing the state of the useful arts, by providing methods and structure for reducing the number of internal communication paths within a switching device. A switching circuit of the device comprises a first stage circuit adapted to couple any of the N physical links with a selected one of N/2 communication paths of the switching circuit and comprises a second stage circuit adapted to couple any of the N/2 communication paths with any of the N physical links.

In one aspect hereof, an enhanced switching device is provided that comprises a plurality of physical links wherein the number of physical links is "N" and wherein each physical link is adapted to couple the switching device with a corresponding other device. The device also comprises a switching circuit coupled with each of the plurality of physical links. The switching circuit comprises N/2 communication paths, a first stage circuit adapted to selectively couple any one of the plurality of physical links with any one of the N/2 communication paths, and a second stage circuit adapted to receive each of the N/2 communication paths and further adapted to selectively couple any one of the N/2 communication paths with any one of the plurality of physical links. The device further comprises a control unit coupled with the switching circuit and adapted to controllably configure the first stage circuit and the second stage circuit to couple any one of the plurality of physical links with any other of the plurality of physical links through a selected one of the N/2 communication paths.

Another aspect hereof provides a method operable in a switching device. The switching device having a plurality ("N") of physical links. The method comprises detecting a request from a first physical link of the N physical links to establish a connection to a second physical link of the N physical links and operating, responsive to detecting the request to establish, a first stage circuit of the switching device to couple the first physical link with a selected communication path of N/2 communication paths within the switching device. The method further comprises operating responsive to detecting the request to establish, a second stage circuit of the switching device to couple the second physical link with the selected communication path. The method thereby couples the first and second physical links through the switching device.

Still another aspect hereof provides a SAS expander comprising a plurality of PHYs each adapted to couple the expander with another SAS device wherein the number of PHYs is "N" and a switching circuit adapted to selectively couple any of the N PHYs with any other of the N PHYs. The switching circuit comprises N/2 communication paths and N/2 first stage multiplexers. Each first stage multiplexer is coupled with each of the N PHYs and each first stage multiplexer is adapted to couple a selected one of the outputs of the N PHYs with a corresponding one of the N/2 communication paths. The switching circuit also comprises N second stage multiplexers wherein each second stage multiplexor multiplexer is coupled with each of the N/2 communication paths and wherein each second stage multiplexer is adapted couple a selected one of the N/2 communication paths with a corresponding one of the N PHYs. The expander also comprises a control unit coupled with the switching circuit and adapted to controllably operate the first stage multiplexers and the second stage multiplexers to couple any one of the plurality of PHYs with any other of the plurality of PHYs through a selected one of the N/2 communication paths.

DETAILED DESCRIPTION OF THE DRAWINGS

Figure 1:
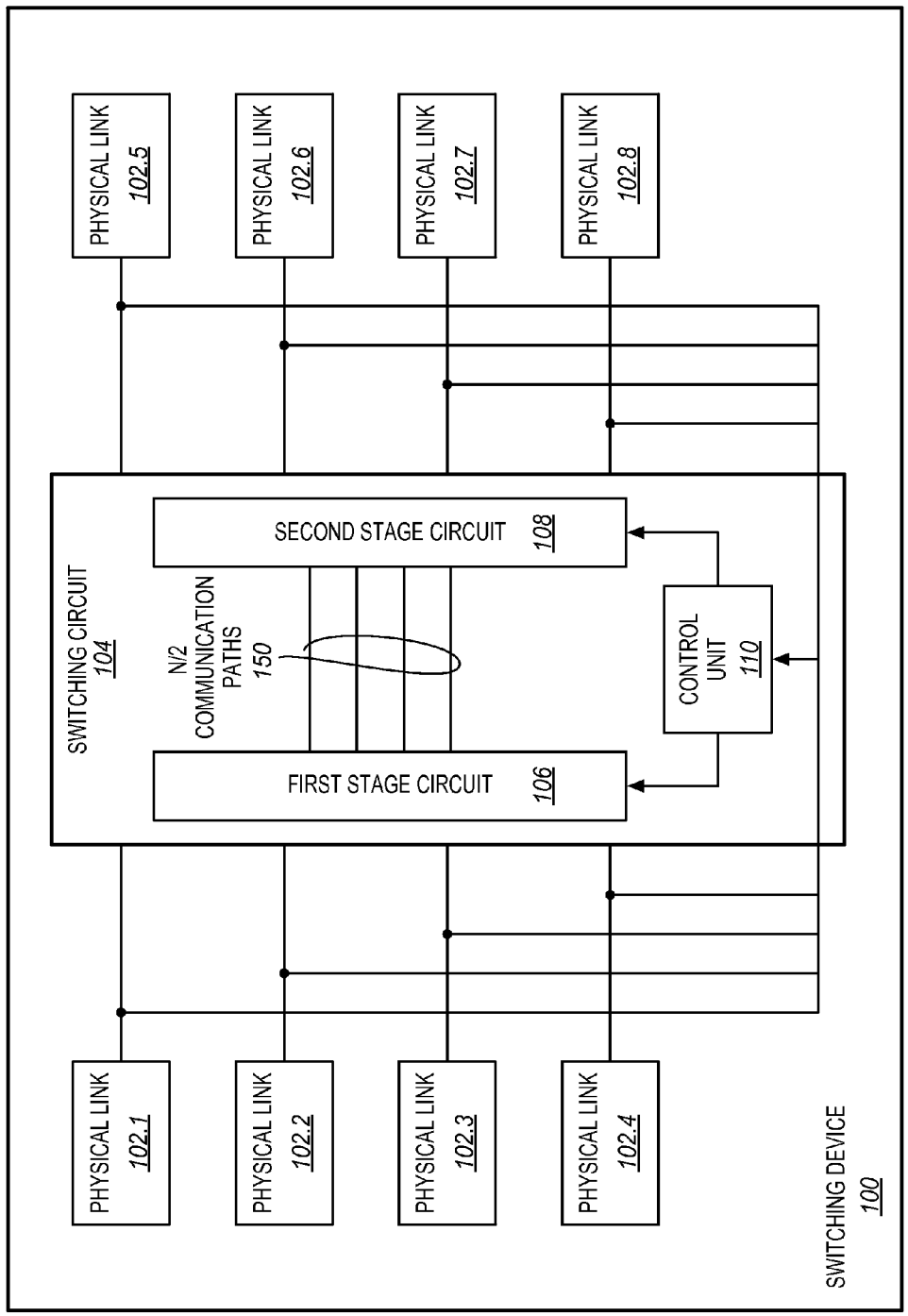
FIG. 1 is a block diagram of an exemplary switching device enhanced in accordance with features and aspects hereof to utilize a reduced number of internal communication paths within a switching circuit of the device.

FIG. 1 is a block diagram of an exemplary switching device 100 enhanced in accordance with features and aspects hereof to reduce layout congestion for a switching circuit within switching device 100. Switching device 100 comprises switching circuit 104 and a plurality of physical links 102.1 through 102.8 all coupled with switching circuit 104. Switching circuit 104 is generally operable to controllably couple a first physical link with another physical link of switching device 100. Switching device 100 may comprise any number of physical links 102.1 through 102.8 as appropriate for a particular application. In general, the number of such physical links within switching device 100 is referred to herein as "N". Each physical link 102.1 through 102.8 comprises any suitable circuitry for communicatively coupling switching device 100 to another external device. In some exemplary embodiments, switching device 100 may be a Serial Attached SCSI (SAS) expander having a plurality of physical links referred to as "PHYs".

Switching circuit 104 comprises any circuit suitable for controllably coupling any of the N physical links (102.1 through 102.8) to any other of the N physical links. As noted above, most such switching circuits 104 are generally referred to as "crossbar" switches in that any physical link coupled with the switch may be selectively, controllably, temporarily, coupled with any of the other physical links coupled with the switching circuit. As noted above, prior designs required $N^2$ communication paths (where "N" is the number of physical links of the device) to assure a connection path for every possible coupling of a first physical link with a second physical link. By contrast, in accordance with features and aspects hereof, switching circuit 104 comprises fewer communication paths 150 used for temporarily coupling any physical link to any other physical link. More specifically, switching circuit 104 comprises N/2 communication paths 150 where N/2 refers to one half of the number (N) of physical links 102.1 through 102.8 within switching device 100. Thus, as exemplified in FIG. 1, since there are eight physical links within switching device 100, switching circuit 104 comprises N/2 or four communication paths 150. It will be understood by those of ordinary skill in the art that "N/2" is determined by rounding up any fractional value to the next higher integer. For example, where switching device 100 comprises an odd number of physical links, N/2 would be rounded up to the next higher integer value (i.e., for a switching device 100 comprising nine physical links, communication paths 150 would comprise five communication paths).

The enhanced architecture of device 100 is based on the observation that, at any given time, only half of the physical links may be coupled with any of the other half of the total number of physical links.

Switching circuit 104 further comprises first stage circuit 106 and second stage circuit 108 that, in combination with control unit 110, controllably couples any physical link 102.1 through 102.8 to any other physical link through any of the presently unused N/2 communication paths 150. In general, first stage circuit 106 comprises any suitable logic circuits adapted to selectively couple any of physical links 102.1 through 102.8 with a selected one of the N/2 communication paths 150. In like manner, second stage circuit 108 comprises any suitable logic circuits adapted to selectively couple any of communication paths 150 to any of physical links 102.1 through 102.8. Control unit 110 comprises any suitable logic circuits adapted to detect receipt of a request to establish a connection and adapted to configure first stage circuit 106 and second stage circuit 108 to establish the requested connection between a first and second physical link.

Control unit 110 may be coupled with each of physical links 102.1 through 102.8 so as to "snoop" communications from a first such physical link requesting a temporary coupling with a second of the physical links. Responsive to detecting receipt of such a request, control unit 110 appropriately configures first stage circuit 106 and second stage circuit 108 within switching circuit 104 to provide the requested coupling through any of the unused N/2 communication paths 150.

By reducing the number of communication paths 150 within switching circuit 104 to half of the number of physical links (N), layout congestion of switching circuit 104, and thus of switching device 100, is reduced to simplify design and manufacturing of an integrated circuit die for switching circuit 104 and/or switching device 100. Those of ordinary skill in the art will readily recognize that logic circuits for first stage circuit 106, second stage circuit 108, and control unit 100 may be integrated within a single integrated circuit thus giving rise to the desirability of reducing layout congestion by reducing the number of communication paths 150 within switching circuit 104. Further, switching circuit 104 may be integrated with, or distinct from, circuits for implementing physical links 102.1 through 102.8. Still further, all circuits within switching device may be designed in any suitable manner as one or more integrated circuit components to provide the full functionality of switching device 100. Those of ordinary skill in the art will readily recognize numerous additional and equivalent elements that may be present in a fully functional switching device. Such additional and equivalent elements are omitted herein for simplicity and brevity of this discussion.

Figure 2:
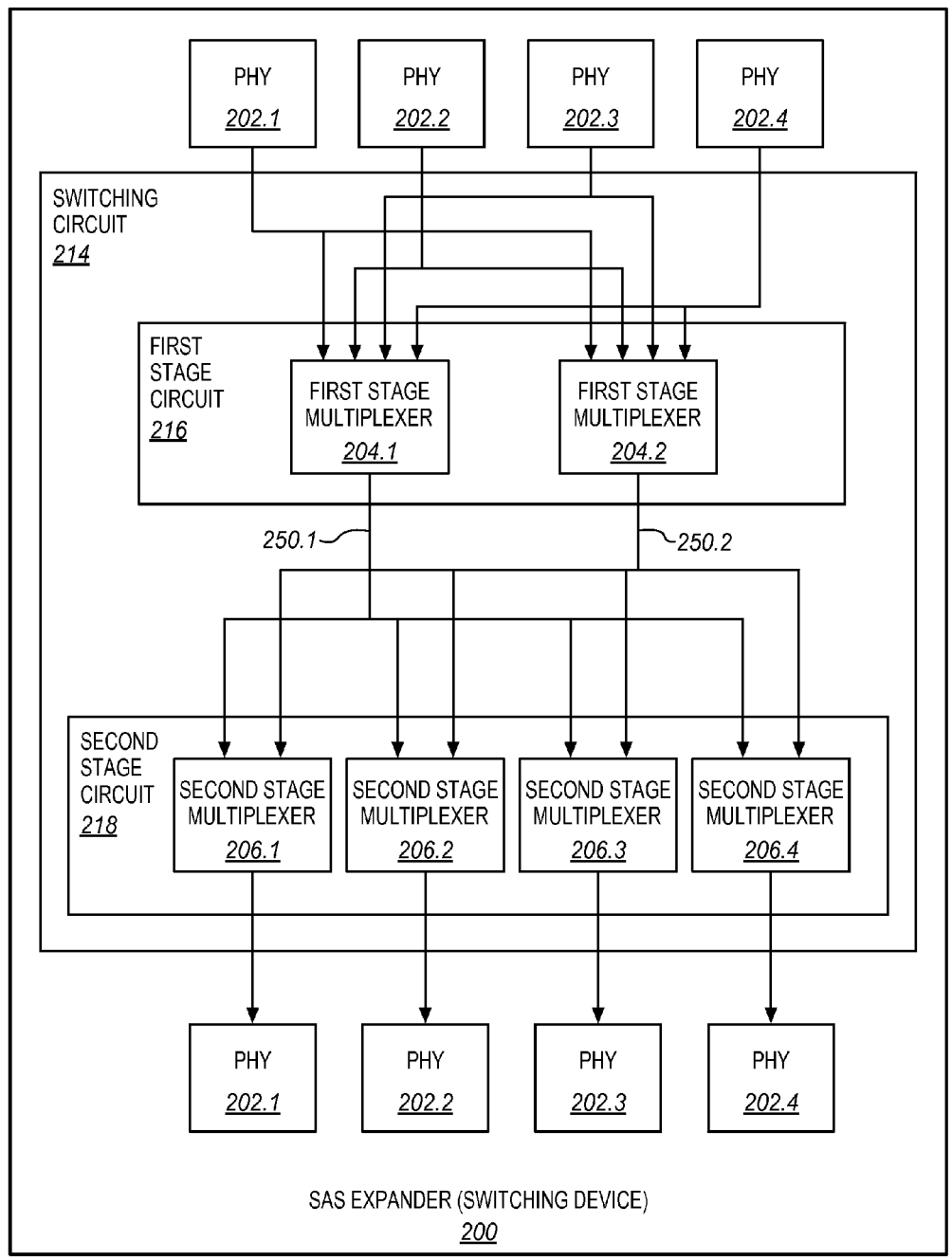
FIG. 2 is a block diagram of an exemplary SAS expander (switching device) enhanced in accordance with features and aspects hereof to utilize a reduced number of internal communication paths within a switching circuit of the expander.

FIG. 2 is a block diagram of another exemplary switching device enhanced in accordance with features and aspects hereof to reduce the number of internal communication paths required to couple any of N physical links of the device with any other of the N physical links. The exemplary switching device of FIG. 2 may be a SAS expander 200 comprising a plurality of PHYs 202.1 through 202.4 (e.g., a plurality of "physical links"). SAS expander 200 further comprises switching circuit 214 adapted for selectively coupling any of PHYs 202.1 through 202.4 to any other of the PHYs. As noted above with respect to FIG. 1, SAS expander 200 may comprise any suitable number of PHYs. The number of such PHYs is referred to herein as "N". Each PHY 202.1 through 202.4 comprises any suitable logic circuits for implementing physical and/or link layers of the SAS protocols.

Expander 200 further comprises switching circuit 214 adapted to selectively couple any of PHYs 202.1 through 202.4 to any other of the PHYs. Switching circuit 214 comprises first stage circuit 216 and first second stage circuit 218 each adapted to selectively couple any of PHYs 202.1 through 202.4 to any other of the PHYs through an unused one of communication paths 250.1 and 250.2. As noted above, communication paths 250.1 and 250.2 represent N/2 communication paths where N is the number of PHYs in expander 200. In the exemplary embodiment of FIG. 2, N is four and hence there are N/2 or two communication paths coupled between first stage circuit 216 and second stage circuit 218. As noted above, where N is an odd number, N/2 represents the number of paths rounded up to the next integer number.

First stage circuit comprises N/2 (e.g., in the exemplary embodiment of FIG. 2, two) first stage multiplexer circuits 204.1 and 204.2. Each first stage multiplexer circuit has N inputs each coupled to a corresponding one of the N PHYs 202.1 through 202.4. The output of each first stage multiplexer 204.1 and 204.2 is coupled to a corresponding one of the N/2 communication paths (i.e., 250.1 and 250.2, respectively). Second stage circuit comprises N (in the example—4) second stage multiplexer circuits 206.1 through 206.4. Each second stage multiplexer comprises N/2 inputs each coupled with a corresponding one of the N/2 communication paths (e.g., 250.1 and 250.2). The output of each second stage multiplexer 206.1 through 206.4 is coupled with a corresponding one of the N PHYs (e.g., 202.1 through 202.4, respectively). Suitable control logic (not shown in FIG. 2) applies an appropriate selection input signal to each of first stage multiplexers 204.1 and 204.2 and to each of second stage multiplexer's 206.1 through 206.4 to configure the first stage circuit 216 and second stage circuit 218 as required to couple any of PHYs 202.1 through 202.4 to any other of the multiple PHYs.

In operation, suitable control logic of the switching circuit detects receipt of a request to establish a connection between two PHYs. A first PHY (e.g., first physical link) transmits such an open request detected by control logic within switching circuit 214. For example, in the context of a SAS expander, such a request may be encoded as a SAS Open Address Frame (OAF). Responsive to detecting receipt of such a request, control logic within switching circuit 214 identifies an unused communication path (e.g., 250.1 or 250.2). Having identified such an unused path, control logic configures the corresponding first stage multiplexer 204.1 or 204.2, respectively, to select the requesting PHY (the first PHY) as the selected input for the first stage multiplexer having its output coupled with the selected, unused path. In addition, control logic of switching circuit 214 identifies a second stage multiplexer 206.1 through 206.4 having its output coupled with the second PHY identified in the request to establish a connection. The identified second stage multiplexer is then configured by the control logic to select as its input the identified, selected, unused communication paths (250.1 or 250.2). Thus, control logic within switching circuit 214 establishes the requested connection between the requesting first PHY and the identified second PHY through one of the N/2 communication paths 250.1 or 250.2.

As noted above, the enhanced structure of FIG. 2 reduces layout congestion in the integrated circuit die that implements switching circuit 214. Rather than $N^2$ or even N internal communication paths, the enhanced structure of FIG. 2 reduces the number of such communication paths to N/2 (rounded up to the next higher integer as noted above). Further, those of ordinary skill in the art will readily recognize that any number (N) of PHYs may be present in such an expander and a corresponding number (N/2) of internal communication paths may be provided in the design of switching circuit 214. Still further, those of ordinary skill in the art will recognize numerous additional and equivalent elements that may be present in a fully functional enhanced SAS expander 200. Such additional and equivalent elements are omitted here in for simplicity and brevity of this discussion.

Figure 3:
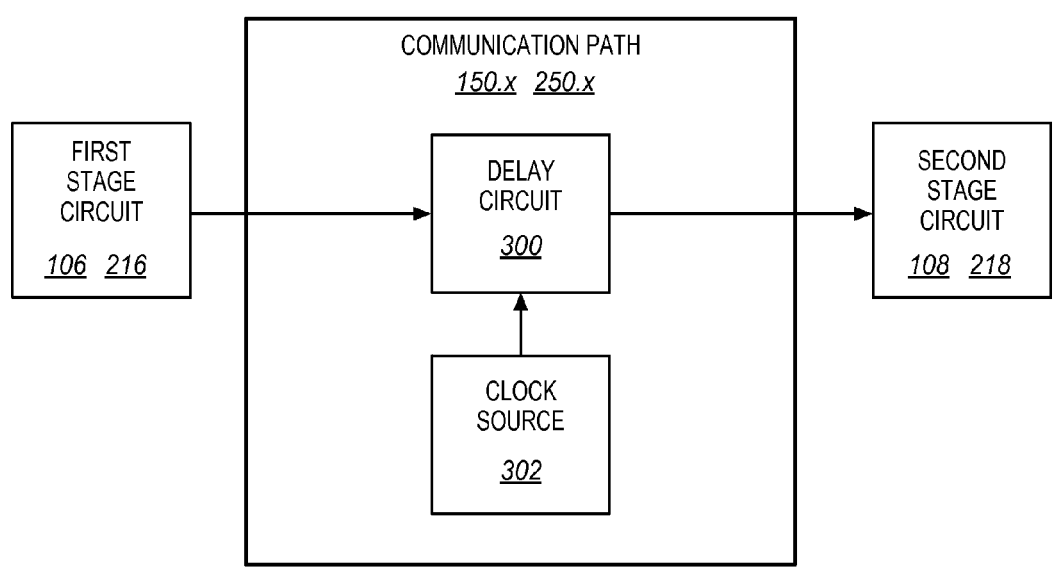
FIG. 3 is a block diagram of an exemplary communication path of FIGS. 1 and 2 utilizing a pipelined delay architecture in accordance with features and aspects hereof.

FIG. 3 is a block diagram providing exemplary additional details for a pipelined architecture in each of the N/2 communication paths (e.g., paths 150.x and 250.x of FIGS. 1 and 2, respectively). Each such communication path couples between a first stage circuit (e.g., first stage circuit 106 and 216 of FIGS. 1 and 2, respectively) and a second stage circuit (e.g., second stage circuit 108 and 218 of FIGS. 1 and 2, respectively). In the exemplary embodiment of FIG. 3, each communication path comprises a delay circuit 300 to insert a pipelined delay in the communications between a first stage circuit and a second stage circuit. Such a delay may be useful to break a large timing arc in the routing or layout of the communication path. Where, for example, the first stage circuits are implemented in a first area of the circuit die and the second stage circuits are in a different area, the pipeline delay element can ease any timing restrictions (i.e., large timing arcs) that may arise in the communication paths that couple between the first and second stage circuits. This pipelined delay can ease such timing requirements and offer some flexibility for routing of the communication paths within an integrated circuit die. In some embodiments, the timing arcs may be small enough between the first and second stage circuits that no pipeline delay is required to meet timing constraints within the circuit die. Where such a delay is required, in one exemplary embodiment, delay circuit 300 may comprise a flip-flop circuit clocked by a clock signal from clock source 302 providing a high-speed clock for latching each signal within flip-flop delay circuit 300. Those of ordinary skill in the art will readily recognized numerous equivalent circuit designs to provide for such a pipelined delay. Further, the architecture may be enhanced to provide one or more clock cycles delay as required for a particular application with particular associated timing and routing requirements for the switching circuit design.

Figure 4:
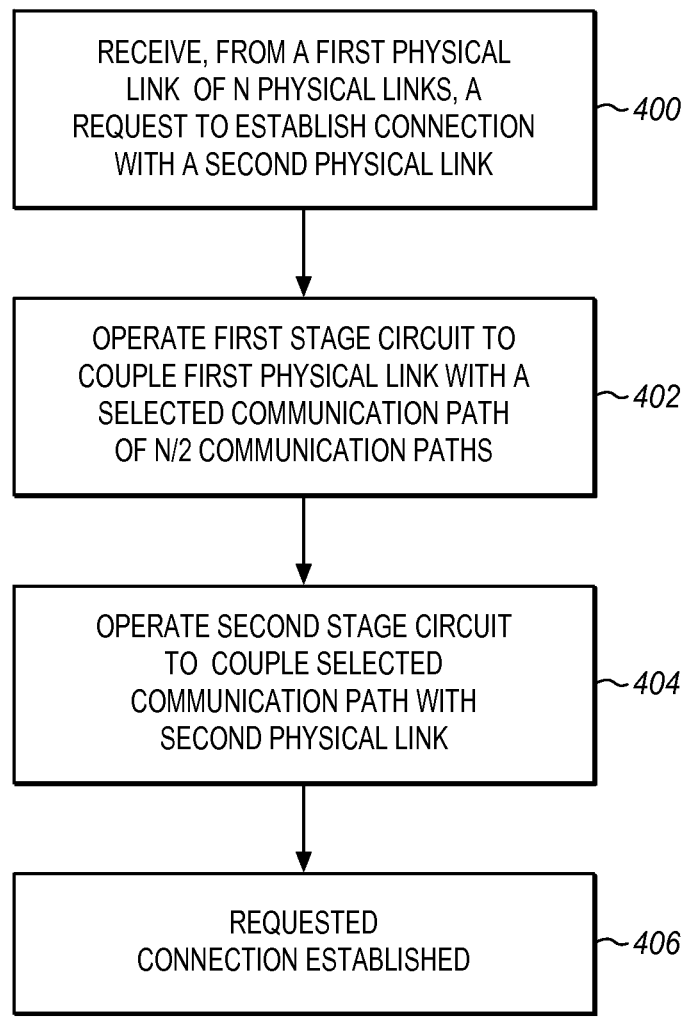
FIGS. 4 and 5 are flowcharts describing exemplary methods for operating an enhanced switching device such as in FIGS. 1 through 3 having a reduced number of internal communication paths.

FIG. 4 is a flowchart describing an exemplary method in accordance with features and aspects hereof to reduce layout/design congestion in a switching circuit of a switching device. The method of FIG. 4 may be operable in an enhanced switching device such as switching device 100 or 200 of FIGS. 1 through 3. More specifically, the method of FIG. 4 may be operable, for example, in suitable control logic within a switching circuit such as described above with respect to FIGS. 1 through 3. At step 400, control logic of the switching circuit detects receipt of a request to establish a connection from a first physical link of the N physical links of the device. The request from a first physical link identifies a second physical link of the switching device to which the connection is requested. For example, in the context of a SAS switching device (e.g., a SAS expander), such a request may be encoded as a SAS Open Address Frame (OAF). At step 402, responsive to receipt of the request, control logic of the switching circuit operates the first stage circuit to couple the first physical link with a selected, unused communication path of the N/2 communication paths within the switching circuit. In some exemplary embodiments a simple register or other bit mask memory structure may be used to identify which of the N/2 communication paths is presently used or unused. Any other suitable table structure in a memory component of the switching circuit may be employed in other embodiments to record not only which communication path is presently used or unused but also, where a path is used, which physical link the communication path is presently associated with. At step 404, control logic of the switching circuit operates a second stage circuit to couple the selected communication path with the second physical link. By so operating the first and second stage circuit, at step 406, the requested connection is established between the first and second physical links utilizing one of N/2 communication paths within the switching circuit of the switching device. Thus, step 406 represents the establishment of the requested connection and appropriate utilization of the connection as required for the particular mutation application.

Figure 5:
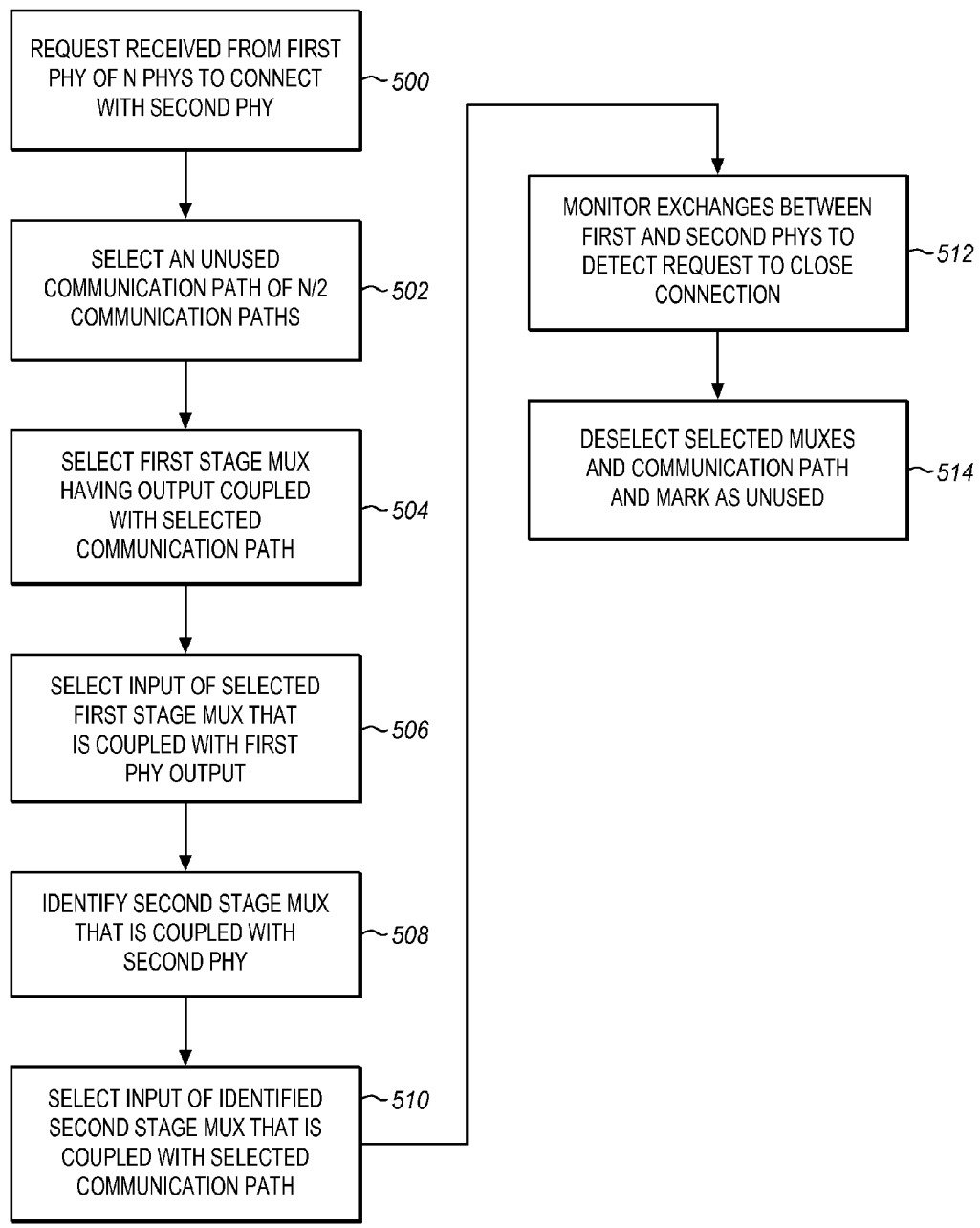

FIG. 5 is a flowchart describing another exemplary method operable within an enhanced switching device to establish requested connections utilizing a reduced number of internal communication paths so as to reduce complexity and congestion in the layout and routing of a switching circuit design in accordance with features and aspects hereof. The method of FIG. 5 may be operable in an enhanced switching device such as discussed above with respect to FIGS. 1 through 3. In particular, the method of FIG. 5 may be operable in suitable control logic within a switching circuit of such enhanced switching devices. The method of FIG. 5 is described in the context of a SAS expander as an enhanced switching device. A SAS expander comprises a plurality (N) of physical links (referred to in the context of SAS as PHYs). Further, the method of FIG. 5 is described in the context of a multiplexer implementation such as described in additional detail in FIG. 2. In such an embodiment, as shown in FIG. 2, a first stage circuit comprises N/2 first stage multiplexers each having N inputs coupled to the N PHYs. The output of each first stage multiplexer is coupled to a corresponding one of the N/2 communication paths within the switching circuit. Further, such a multiplexer embodiment as in FIG. 2 comprises a second stage circuit having N second stage multiplexers. Each second stage multiplexer has N/2 inputs each coupled with the corresponding one of the N/2 communication paths within the switching circuit. The output of each of the N second stage multiplexers is coupled with a corresponding one of the N PHYs of the enhanced expander.

At step 500, control logic within the switching circuit detects receipt of a request from a first PHY of to establish a connection with an identified second PHY. At step 502, control logic of the switching circuit selects an unused communication path of the N/2 communication paths within the enhanced switching circuit of the SAS expander. Selecting such an unused communication path therefore also inherently selects (at step 504) the corresponding first stage multiplexer to be used in establishing the requested connection. At step 506 the selected first stage multiplexer is controlled to select its input that is coupled with the first PHY that generated the connection request. Step 508 then identifies the second stage multiplexer that has its output coupled with the identified second PHY from the connection request. At step 510 the control logic of the enhanced switching circuit selects the appropriate input of the identified second stage multiplexer that is coupled with the identified, selected, previously unused communication path. At step 512, control logic of the enhanced switching device monitors exchanges between the first and second PHYs to detect receipt of a request to close the established connection. Responsive to receipt of such a request to close, step 514 decouples the first and second PHYs thereby freeing the communication path (and the selected multiplexers of the first and second stage circuits) for use in establishing another connection.

Those of ordinary skill in the art will recognize in FIGS. 4 and 5 numerous additional and equivalent steps in a fully operational method operable in a switching device having reduced number of internal communication paths to reduce layout and design congestion. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a Serial Attached Small Computer System Interface (SAS) expander comprising a SAS independent switching device, the SAS) expander having a plurality of physical links (PHYs), the number of said PHYs being "N", the method comprising:

detecting a SAS request from a first PHY of the N PHYs to establish a SAS connection to a second PHY of the N PHYs;

operating, responsive to detecting the SAS request, a first stage circuit of the switching device to couple the first PHY with an unused communication path of N/2 communication paths within the switching device; and operating, responsive to detecting the request, a second stage circuit of the switching device to couple the second PHY with the unused communication path, whereby the first and second PHYs are coupled through the switching device.

2. The method of claim 1 further comprising:

detecting a SAS request from the first PHY to close a previously established SAS connection to the second PHY;

operating, responsive to detecting the SAS request to close, the first and second stage circuits to de-couple the first and second PHYs from the coupled communication path.

3. The method of claim 1 wherein the first stage circuit comprises N/2 first stage multiplexers wherein each first stage multiplexer is coupled with each of the N PHYs and wherein each first stage multiplexer is adapted to couple an output of the N PHYs with a corresponding one of the N/2 communication paths, and wherein the step of operating the first stage circuit comprises:

selecting another unused one of the first stage multiplexers having its output path coupled with the other unused communication path; and selecting an input of the selected first stage multiplexer that is coupled with the first PHY; and wherein the step of operating the second stage multiplexer comprises:

selecting an input of the second stage multiplexer that is coupled with the other unused communication path.

4. A Serial Attached Small Computer System Interface (SAS) expander comprising:
- a plurality of SAS physical links (PHYs) each adapted to couple the expander with another SAS device wherein the number of PHYs is "N";
- a SAS independent switching circuit adapted to selectively couple any of the N PHYs with any other of the N PHYs, the switching circuit comprising:
- N/2 communication paths;
- N/2 first stage multiplexers wherein each first stage multiplexer is coupled with each of the N PHYs and wherein each first stage multiplexer is adapted to couple an output of a selected one of the N PHYs with a corresponding one of the N/2 communication paths; and
- N second stage multiplexers wherein each second stage multiplexer is coupled with each of the N/2 communication paths and wherein each second stage multiplexer is adapted to couple a selected one of the N/2 communication paths with a corresponding one of the N PHYs; and
- a control unit coupled with the switching circuit and adapted to controllably operate the first stage multiplexers and the second stage multiplexers to couple any one of the plurality of PHYs with any other of the plurality of PHYs through an unused one of the N/2 communication paths.

5. The expander of claim 4
wherein the control unit is coupled with each of the plurality of PHYs,
wherein the control unit is further adapted to detect receipt in the switching device of a request from a first PHY to establish a SAS connection with an identified second PHY, and
wherein the control unit is adapted to controllably operate the first stage multiplexers and the second stage multiplexers to couple the first PHY with the second PHY through the unused one of the N/2 communication paths responsive to detection of the request.

6. The expander of claim 5
wherein the control unit is further adapted to detect receipt in the switching device of a request from a first PHY to close a previously established SAS connection with an identified second PHY, and
wherein the control unit is adapted to controllably operate the first stage multiplexers and the second stage multiplexers to de-couple the first PHY and the second PHY responsive to detection of the request to close.

7. The expander of claim 4
wherein each of the N/2 communication paths comprises a delay circuit for delaying a signal received from the first stage circuit before applying the delayed signal to the second stage circuit.

8. The expander of claim 7
wherein the switching circuit further comprises a clock source adapted to generate a clock signal,
wherein the delay circuit delays the signal by a single clock cycle of the clock signal.

9. A Serial Attached Small Computer System Interface (SAS) expander operable to establish SAS connections between devices, the expander comprising:
- a plurality of physical links (PHYs);
- wherein a first of the PHYs is operable to receive a SAS request to establish a SAS connection with a second of the PHYs; and
- a switching circuit communicatively coupled to each of the PHYs and comprising a plurality of communication paths,
- wherein a number of the communication paths is about half of a number of the PHYs in the expander, and
- wherein the switching circuit is operable to detect the SAS request from the first PHY, to identify an unused one of the communication paths, to connect the first PHY to a first end of the unused communication path, to connect the second PHY to a second end of the unused communication path to link the first and second PHYs and allow the first and second PHYs to establish the SAS connection through the communication path.

10. The SAS expander claim 9, wherein:
the switching circuit is further operable to detect a request from the first PHY to break the SAS connection, to determine when the SAS connection between the first and second PHYs is broken, and to relinquish the communication path between the first and second PHYs after the SAS connection is broken.

11. The expander of claim 9
wherein each of the communication paths comprises a delay circuit for delaying a signal received from the first stage circuit before applying the delayed signal to the second stage circuit.

12. The expander of claim 7
wherein the switching circuit further comprises a clock source adapted to generate a clock signal,
wherein the delay circuit delays the signal by a single clock cycle of the clock signal.

* * * * *